US 9,705,792 B2

(12) United States Patent
Cohn

(10) Patent No.: US 9,705,792 B2
(45) Date of Patent: *Jul. 11, 2017

(54) AUTHORIZING COMMUNICATIONS BETWEEN COMPUTING NODES

(71) Applicant: Amazon Technologies, Inc., Reno, NV (US)

(72) Inventor: Daniel T. Cohn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 567 days.

This patent is subject to a terminal disclaimer.

(21) Appl. No.: 13/691,497

(22) Filed: Nov. 30, 2012

(65) Prior Publication Data

US 2013/0132577 A1 May 23, 2013

Related U.S. Application Data

(63) Continuation of application No. 12/060,099, filed on Mar. 31, 2008, now Pat. No. 8,429,739.

(51) Int. Cl.
*H04L 12/713* (2013.01)
*H04L 12/24* (2006.01)
(Continued)

(52) U.S. Cl.
CPC ...... *H04L 45/586* (2013.01); *H04L 29/12028* (2013.01); *H04L 29/12358* (2013.01);
(Continued)

(58) Field of Classification Search
CPC ............ H04L 45/586; H04L 29/12028; H04L 29/12358; H04L 29/12801; H04L 41/28;
(Continued)

(56) References Cited

U.S. PATENT DOCUMENTS 6,118,784 A    9/2000  Tsuchiya et al.
6,411,967 B1   6/2002  Van Renesse
(Continued)

FOREIGN PATENT DOCUMENTS

JP    2004-357292 A    12/2004
JP    2007-151141 A    6/2007
(Continued)

OTHER PUBLICATIONS

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.

(Continued)

*Primary Examiner* — Michael Pyzocha
(74) *Attorney, Agent, or Firm* — Seed IP Law Group LLP

(57) ABSTRACT

Techniques are described for managing communications between multiple computing nodes, such as computing nodes that are separated by one or more physical networks. In some situations, the techniques may be used to provide a virtual network between multiple computing nodes that are separated by one or more intermediate physical networks, such as from the edge of the one or more intermediate physical networks by modifying communications that enter and/or leave the intermediate physical networks. In some situations, the computing nodes may include virtual machine nodes hosted on one or more physical computing machines or systems, such as by or on behalf of one or more users (e.g., users of a program execution service). The managing of the communications may include determining whether communications sent to managed computing nodes are (Continued)

authorized, and providing the communications to the computing nodes only if they are determined to be authorized.

30 Claims, 7 Drawing Sheets

(51) Int. Cl.
*H04L 29/12* (2006.01)
*H04L 29/06* (2006.01)

(52) U.S. Cl.
CPC ........ *H04L 29/12801* (2013.01); *H04L 41/00* (2013.01); *H04L 41/28* (2013.01); *H04L 61/103* (2013.01); *H04L 61/251* (2013.01); *H04L 61/6004* (2013.01); *H04L 63/20* (2013.01)

(58) Field of Classification Search
CPC . H04L 61/103; H04L 61/251; H04L 61/6004; H04L 63/20; H04L 41/00
USPC ........... 726/15, 27, 28, 29, 30; 709/237, 245
See application file for complete search history.

(56) References Cited

U.S. PATENT DOCUMENTS

| | | | |
|---|---|---|---|
| 6,529,953 | B1 | 3/2003 | Van Renesse |
| 6,724,770 | B1 | 4/2004 | Van Renesse |
| 6,766,371 | B1* | 7/2004 | Hipp et al. ............... 709/225 |
| 6,950,879 | B2* | 9/2005 | Zhou ........................ 709/245 |
| 7,028,333 | B2* | 4/2006 | Tuomenoksa et al. .......... 726/3 |
| 7,042,865 | B1 | 5/2006 | Meier et al. |
| 7,068,666 | B2 | 6/2006 | Foster et al. |
| 7,068,667 | B2 | 6/2006 | Foster et al. |
| 7,069,437 | B2 | 6/2006 | Williams |
| 7,124,289 | B1 | 10/2006 | Suorsa |
| 7,131,123 | B2 | 10/2006 | Suorsa et al. |
| 7,152,109 | B2 | 12/2006 | Suorsa et al. |
| 7,516,206 | B2 | 4/2009 | Henseler et al. |
| 7,685,148 | B2 | 3/2010 | Engquist et al. |
| 7,729,365 | B2* | 6/2010 | Motegi et al. ............... 370/401 |
| 7,739,328 | B1 | 6/2010 | Champion |
| 7,836,205 | B2* | 11/2010 | Thomas .................... 709/245 |
| 7,865,586 | B2 | 1/2011 | Cohn |
| 7,949,785 | B2 | 5/2011 | Alkhatib et al. |
| 8,068,817 | B1 | 11/2011 | Viswanath et al. |
| 8,375,421 | B1 | 2/2013 | Shigapov et al. |
| 2002/0019875 | A1 | 2/2002 | Garrett et al. |
| 2002/0062388 | A1 | 5/2002 | Ogier et al. |
| 2002/0138628 | A1* | 9/2002 | Tingley et al. ............... 709/227 |
| 2003/0088697 | A1 | 5/2003 | Matsuhira |
| 2003/0131131 | A1 | 7/2003 | Yamada et al. |
| 2003/0152074 | A1* | 8/2003 | Hawkins et al. ............. 370/389 |
| 2003/0162499 | A1* | 8/2003 | Jonsson .................. H04L 45/04 370/351 |
| 2004/0010618 | A1 | 1/2004 | Thomas |
| 2004/0098619 | A1* | 5/2004 | Shay ........................ H04L 63/02 726/13 |
| 2004/0230670 | A1 | 11/2004 | Schmidt-Karaca et al. |
| 2005/0021755 | A1* | 1/2005 | Hipp et al. ............... 709/225 |
| 2005/0025157 | A1* | 2/2005 | Pennec et al. ............. 370/395.5 |
| 2005/0120160 | A1 | 6/2005 | Plouffe et al. |
| 2005/0135359 | A1 | 6/2005 | Chang |
| 2005/0188105 | A1 | 8/2005 | Reinhard et al. |
| 2006/0085530 | A1 | 4/2006 | Garrett |
| 2006/0130147 | A1 | 6/2006 | Von-Maszewski |
| 2006/0209831 | A1 | 9/2006 | Shepherd et al. |
| 2007/0143422 | A1 | 6/2007 | Cai |
| 2007/0143851 | A1 | 6/2007 | Nicodemus et al. |
| 2007/0153782 | A1* | 7/2007 | Fletcher ................ H04J 3/1617 370/389 |
| 2007/0192858 | A1 | 8/2007 | Lum |
| 2007/0239987 | A1 | 10/2007 | Hoole et al. |
| 2007/0271453 | A1 | 11/2007 | Pohja et al. |
| 2007/0280243 | A1* | 12/2007 | Wray ................... H04L 12/4633 370/392 |
| 2007/0297430 | A1 | 12/2007 | Nykanen et al. |
| 2008/0013554 | A1* | 1/2008 | Motegi et al. ................. 370/401 |
| 2008/0043755 | A1 | 2/2008 | Nordmark et al. |
| 2008/0072312 | A1* | 3/2008 | Takeyoshi et al. ............. 726/15 |
| 2008/0151893 | A1 | 6/2008 | Nordmark et al. |
| 2008/0183853 | A1* | 7/2008 | Manion ............... H04L 12/4641 709/223 |
| 2008/0222729 | A1 | 9/2008 | Chen et al. |
| 2008/0301303 | A1* | 12/2008 | Matsuoka .................... 709/227 |
| 2008/0313318 | A1 | 12/2008 | Vermeulen et al. |
| 2009/0003353 | A1* | 1/2009 | Ding ...................... H04L 45/64 370/395.53 |
| 2009/0037607 | A1 | 2/2009 | Farinacci et al. |
| 2009/0122699 | A1 | 5/2009 | Alperovitch et al. |
| 2009/0199177 | A1* | 8/2009 | Edwards ............... G06F 9/5077 718/1 |
| 2009/0232144 | A1* | 9/2009 | Lee .......................... 370/395.31 |
| 2009/0248896 | A1 | 10/2009 | Cohn |
| 2009/0249473 | A1 | 10/2009 | Cohn |
| 2009/0285207 | A1 | 11/2009 | Cohen et al. |
| 2010/0138488 | A1 | 6/2010 | Fletcher et al. |

FOREIGN PATENT DOCUMENTS

| | | |
|---|---|---|
| WO | 01/99354 A1 | 12/2001 |
| WO | 2005/006674 A1 | 1/2005 |
| WO | 2007/126835 A2 | 11/2007 |

OTHER PUBLICATIONS

"Cisco IP Solution Center MPLS VPN Management 4.2," Cisco Systems, Inc., retrieved Jan. 24, 2007, from http://www.cisco.com/en/US/products/sw/netmgtsw/ps5332/products_data_sheet09186a008017d7 . . . , 5 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"MPLS-enabled VPN Services," Data Connection, retrieved Jan. 26, 2007, from http://www.dataconnection.com/solutions/vpn_vlan.htm, 1 page.
"Recent Advances Boost System Virtualization," eWeek.com, retrieved May 3, 2006, from http://www.eweek.com/article2/0,1895,1772626,00.asp, 5 pages.
"Scalable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Reverse Firewall™: Defeating DDoS Attacks Emerging from Local Area Networks," Cs3, Inc., retrieved Nov. 11, 2005, from http://www.cs3-inc.com/rfw.html, 4 pages.
"The Softricity Desktop," Softricity, retrieved May 3, 2006, from http://www.softricity.com/products/, 3 pages.
Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

(56) References Cited

OTHER PUBLICATIONS

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Dilley, J., et al., "Globally Distributed Content Delivery," IEEE Internet Computing, Sep./Oct. 2002, http://computer.org/internet, pp. 50-58.

Draves, R., "Default Address Selection for Internet Protocol version 6 (IPv6)," The Internet Society, Feb. 2003, retrieved Feb. 12, 2008, from http://tools.ietf.org/html/rfc3484, 24 pages.

Farinacci, D., et al., "LISP Alternative Topology (LISP-ALT)," The Internet Society, Nov. 13, 2007, retrieved Mar. 19, 2008, from http://tools.ietforg/html/draft-fuller-lisp-alt-01, 21 pages.

Gruener, J., "A vision of togetherness," May 24, 2004, NetworkWorld, retrieved May 3, 2006, from http://www.networkworld.com/supp/2004/ndc3/0524virt.html, 9 pages.

Hinden, R., et al., "Internet Protocol Version 6 (IPv6) Addressing Architecture," The Internet Society, Apr. 2003, retrieved Feb. 12, 2008, from http://tools.ietf.org/html/rfc3513, 26 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Metz, C., et al., "IPv4-Mapped Addresses on the Wire Considered Harmful," Internet Engineering Task Force, Oct. 21, 2003, retrieved Mar. 27, 2008, from http://www.stindustries.net/IPv6/ietf-internet-drafts/draft-itojun-v6op . . . , 5 pages.

Nordmark, E., "Stateless IP/ICMP Translation Algorithm (SIIT)," The Internet Society, Feb. 2000, retrieved Mar. 19, 2008, from http://tools.ietf.org/html/rfc2765, 26 pages.

Resilient Overlay Networks, "Overview," retrieved Feb. 11, 2008, from http://nms.csail.mit.edu/ron, 5 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Subramanian, L., et al., "OverQoS: An Overlay Based Architecture for Enhancing Internet QoS," $1^{st}$ Symposium on NSDI, Mar. 2004, retrieved Feb. 11, 2008, from http://nms.lcs.mit.edu/papers/overqos-nsdi04.html, 15 pages.

Townsley, M., et al., "Encapsulation of MPLS over Layer 2 Tunneling Protocol Version 3: draft-ietf-mpls-over-l2tpv3-03.txt," Network Working Group, Nov. 2006, retrieved Jun. 15, 2007, from http://tools.ietf.org/html/draft-ietf-mpls-over-l2tpv3-03, 12 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

Zhao et al., "Realization of the SIIT Transform Gateway Based on the Network Processor," *Computer Applications and Software* 24(8):122-124, Aug. 2007. (with English Abstract).

Nordmark, E., "Stateless IP/ICMP Translation Algorithm (SIIT)," The Internet Society, RFC2765, Feb. 2000, 26 pages.

Lua, E. K., et al., "A Survey and Comparison of Peer-to-Peer Overlay Network Schemes," IEEE Communications Surveys & Tutorials, Second Quarter 2005, vol. 7, No. 2, 22 pages.

\* cited by examiner

AUTHORIZING COMMUNICATIONS BETWEEN COMPUTING NODES

BACKGROUND

Many companies and other organizations operate computer networks that interconnect numerous computing systems to support their operations, with the computing systems alternatively co-located (e.g., as part of a private local network) or instead located in multiple distinct geographical locations (e.g., connected via one or more private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

While the availability of data centers and virtualization technologies has provided various benefits, various problems still exist, including problems related to managing communications between virtual machines and/or physical computing systems.

DETAILED DESCRIPTION

Figure 1:
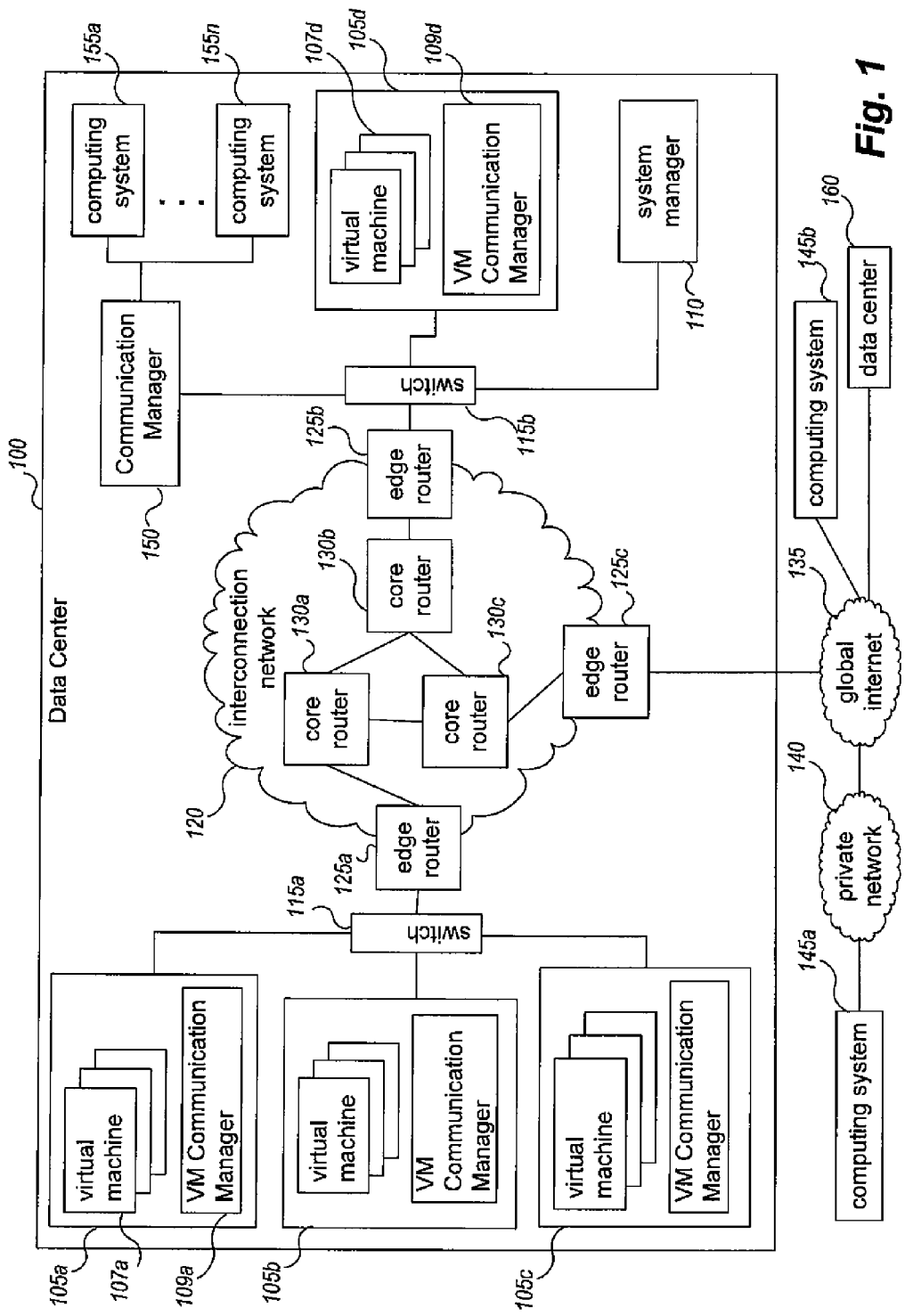
FIG. 1 is a network diagram illustrating an example embodiment of configuring communications between computing nodes belonging to a virtual network.

Techniques are described for managing communications between multiple computing nodes, such as computing nodes that are separated by one or more physical networks. In some embodiments, the techniques may be used to provide a virtual network between multiple computing nodes that are separated by one or more intermediate physical networks, such as multiple computing nodes operated by or on behalf of a single entity. Such a virtual network may be provided in various ways in various embodiments, such as from the edge of the one or more intermediate physical networks by modifying communications that enter and/or leave the intermediate physical networks so as to provide an overlay network, as discussed in greater detail below. In at least some embodiments, some or all of the described techniques are automatically performed by embodiments of a Communication Manager module.

A virtual local network or other virtual network between multiple remote computing nodes may be provided in at least some embodiments by creating an overlay network over one or more intermediate physical networks separating the multiple computing nodes. The overlay network may be implemented in various ways in various embodiments, such as without encapsulating communications by embedding virtual network address information for a virtual network in a larger physical network address space used for a networking protocol of the one or more intermediate physical networks. As one illustrative example, a virtual network may be implemented using 32-bit IPv4 ("Internet Protocol version 4") network addresses, and those 32-bit virtual network addresses may be embedded as part of 128-bit IPv6 ("Internet Protocol version 6") network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. More generally, in some embodiments, an N-bit network address specified in accordance with a first network addressing protocol may be embedded as part of another M-bit network address specified in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N"). Additional details related to SIIT are available at "Request For Comments 2765—Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. Various benefits may be obtained from embedding virtual network address information in physical network addresses for an underlying physical substrate network, including enabling an overlay of the virtual network on the physical substrate network without encapsulating communications or configuring networking devices of the physical substrate network, as discussed in greater detail below. Furthermore, other information may similarly be embedded in the larger physical network address space for a communication between computing nodes in at least some embodiments and situations, such as an identifier specific to a particular virtual network that includes those computing nodes (e.g., a virtual network for an entity on whose behalf those computing nodes operate). Additional details related to provision of such virtual networks via use of overlay networks are included below.

In addition, in at least some embodiments, the computing nodes between which communications are configured may be physical computing systems and/or may be virtual machines that are each hosted on one or more physical computing systems, and the communications may include transmissions of data (e.g., messages, packets, frames, streams, etc.) in various formats. Furthermore, in at least some embodiments, at least some of the computing nodes may be part of a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, one or more system manager modules for the program execution service may track and/or manage which computing nodes belong to which virtual networks, such as based on the computing nodes executing programs on behalf of a customer or other entity, as discussed in greater detail below.

Use of the described techniques may provide various benefits in various situations, such as limiting communications to and/or from computing nodes of a particular virtual network to other computing nodes that belong to that virtual network. In this manner, computing nodes that belong to multiple virtual networks may share parts of one or more intermediate physical networks, while still maintaining network isolation for computing nodes of a particular virtual network. In addition, use of the described techniques allows computing nodes of a virtual network to be physically moved or otherwise positioned as desired, with the overlay network managing routing of communications for a particular virtual network address to a corresponding actual physical network address (e.g., by updating mappings that associate particular virtual network addresses of particular virtual networks to particular physical locations of computing nodes to which those virtual network addresses are assigned). For example, computing nodes of a virtual network may be physically moved between various physical networks while minimizing or eliminating any possible conflicts between hardware addresses of the computing nodes, such as based on management of dummy hardware addresses assigned to computing nodes by associated Communication Manager modules, as described in greater detail elsewhere. In addition to easily moving computing nodes associated with a virtual network, the use of the described techniques also allows computing nodes to easily be added to and/or removed from a virtual network, such as to allow an entity to dynamically modify the size of a virtual network (e.g., to dynamically modify the quantity of computing nodes to reflect an amount of current need for more or less computing resources).

In some cases, such virtual networks may be established and/or maintained via the operation of one or more Communication Manager modules at the edge of one or more intermediate physical networks, such as by configuring and otherwise managing communications for the virtual networks. In particular, groups of one or more computing nodes may each have an associated Communication Manager module that manages communications to and from those computing nodes. For example, if a physical computing system hosts multiple virtual machine computing nodes, a hypervisor or other virtual machine monitor manager on the physical computing system may provide a Communication Manager module for those virtual machine computing nodes. Similarly, one or more physical computing systems may have an associated Communication Manager module in at least some embodiments, such as provided by a proxy computing device through which communications to and from the physical computing systems travel, as provided by a networking device (e.g., a switch, router, hub, etc.) through which communications to and from the physical computing systems travel, etc.

In some situations, a Communication Manager module tracks or otherwise determines the virtual networks to which the module's associated computing nodes belong (e.g., based on entities on whose behalf the virtual networks operate), and then manipulates communications to and/or from each associated computing node so as to reflect its associated virtual network. The determination by a Communication Manager module of a corresponding virtual network for a computing node may be performed in various ways in various embodiments, such as by interacting with a system manager module that provides that information, by tracking software programs executed on such computing nodes, by tracking entities associated with such computing nodes, etc. For example, when a particular computing node begins to execute one or more software programs on behalf of an entity who is a customer of a program execution service, and that customer also has other software programs executing on other computing nodes, the new computing node executing the customer's program(s) may be selected to be associated with a virtual network for the customer that includes those other computing nodes. Alternatively, a customer or other entity may specify a particular virtual network to which a computing node belongs, such as if the entity maintains multiple distinct virtual networks between different groups of computing nodes.

As previously noted, in some embodiments, a program execution service executes third-party customers' programs using multiple physical computing systems (e.g., in one or more data centers) that each host multiple virtual machines, with each virtual machine being able to execute one or more programs for a customer. In such situations, the described techniques may be used by one or more Communication Manager modules executing as part of the program execution service to control communications to and from the programs of each customer. For example, by manipulating communications to and/or from each associated computing node so as to reflect its associated virtual network, a Communication Manager module may prevent computing nodes on other virtual networks from gaining access to those communications, as discussed in greater detail below. In some embodiments, customers may provide programs to be executed to the execution service, and may reserve execution time and other resources on physical or virtual hardware facilities provided by the execution service. In addition, customers and/or the program execution service may define virtual networks that will be used by the program execution service for computing nodes of the customer, so as to transparently provide computing nodes of a virtual network with the appearance of operating on a dedicated physical network.

In at least some embodiments, one or more system manager modules may facilitate configuring communications between computing nodes, such as by tracking and/or managing which computing nodes belong to which virtual networks (e.g., based on executing programs on behalf of a customer or other entity), and by providing information about actual physical network addresses that correspond to virtual network addresses used for a particular virtual network (e.g., by a particular customer or other entity). For example, a system manager module for a PES may receive an indication of a virtual machine on a target physical computing system that is part of one of multiple physical networks of the PES. The system manager module may then determine a virtual network with which the virtual machine is to be associated. After determining the virtual network associated with the virtual machine, the system manager module may then initiate a configuration of a virtual machine Communication Manager module for the target physical computing system so as to associate the virtual machine with the virtual network, or the Communication Manager module may instead initiate that configuration (e.g., when the virtual machine first initiates or receives a communication).

In addition, in at least some embodiments, various information about computing nodes and virtual networks may be used to determine whether communications between computing nodes are authorized, such as if only authorized communications are delivered or forwarded by Communication Manager modules (or if unauthorized communications are handled differently from authorized communications in one or more other manners). By not delivering unauthorized communications to computing nodes, network isolation and security of entities' virtual networks is enhanced.

For example, if a first computing node on a first virtual network attempts to send an outgoing communication to a second computing node on a different second virtual network, and that second virtual network (or the second computing node) has not authorized incoming communications from the first virtual network (or from the first computing node), the first computing node may not be able to even send such a communication onto the one or more intermediate substrate networks between the first and second computing nodes, due to the Communication Manager module associated with that first computing node blocking such an outgoing communication (e.g., by receiving the outgoing communication from the first computing node but not forwarding the outgoing communication, by preventing the first computing node from obtaining information about one or more addresses for the second computing node that would be used in sending such a communication, etc.). In addition, if an unauthorized communication is sent over an intermediate substrate network to an intended destination computing node (e.g., based on a malicious user being able to gain control of a Communication Manager module, or to otherwise gain access to the substrate network), a Communication Manager module that manages communications for the destination computing node may identify and prevent the unauthorized communication from being forwarded to the destination node.

In at least some embodiments, detection and/or prevention of unauthorized communications may be based at least in part on a topology of the one or more intermediate substrate networks on which a virtual network is overlaid. In particular, in at least some embodiments, each computing node that is part of a virtual network is managed by an associated Communication Manager module. As described in greater detail with respect to FIGS. 2A-2C and elsewhere, in at least some such embodiments, the physical network address used for such a computing node for communications over the substrate network includes an indication of the computing node's virtual network address, and includes a partial network address for the substrate network that corresponds to a location of the computing node's associated Communication Manager module (e.g., a sub-network or other portion of the substrate network for which the Communication Manager module manages communications). Thus, in order for a malicious user to correctly construct a valid physical network address for a computing node that is part of a virtual network, the malicious user would need to gain access to information about the virtual network to which the computing node belongs, to gain access to information about the topology of the computing node's physical network location in order to determine the partial network address for the associated Communication Manager module, and to determine how to use that information to construct the physical network address. The validity of constructed physical network addresses may be checked in various ways, such as by identifying a computing node to which a virtual address embedded in a constructed physical network address corresponds, and verifying that a location of that identified computing node corresponds to one of the computing nodes in the portion of the network that corresponds to the partial network address (e.g., one of the computing nodes managed by a Communication Manager module to which the partial network address corresponds). In addition, the validity of constructed physical network addresses may be checked at various times, such as by a Communication Manager module that receives an incoming communication intended for a destination computing node (e.g., to verify that the source physical network address is valid), by a system manager module that receives a message purportedly from a Communication Manager module on behalf of an indicated managed computing node (e.g., a message to request a physical network address for an intended destination computing node of interest), etc.

In addition, in at least some embodiments, detection and/or prevention of unauthorized communications may be based at least in part on virtual networks to which computing nodes belong. In particular, in some embodiments, some or all computing nodes managed by a Communication Manager module are each assigned to one or more virtual networks, such as to correspond to users or other entities on whose behalf the computing nodes are operating (e.g., based on one or more programs being executed on the computing nodes). In such embodiments, some or all virtual networks may have associated rules regarding what communications are allowed between computing nodes on the virtual network and/or between computing nodes from other virtual networks. If so, such predefined rules may be used by Communication Manager modules who receive incoming communications for and/or outgoing communications from associated computing nodes in order to determine whether to forward such communications on or otherwise allow such communications, such as based on information about the virtual network(s) and/or entity(ies) to which a sending computing node and a destination computing node are associated. A Communication Manager module may track and store such information about associated virtual networks and/or entities for associated computing nodes and/or such information about predefined rules for virtual networks, or instead in some embodiments may interact with one or more system manager modules in order to obtain some or all such information. Additional details related to determining whether communications between computing nodes are authorized, and actions corresponding to such determinations, are included below.

For illustrative purposes, some embodiments are described below in which specific types of computing nodes, networks, communications, and configuration operations are performed. These examples are provided for illustrative purposes and are simplified for the sake of brevity, and the inventive techniques can be used in a wide variety of other situations, some of which are discussed below.

FIG. 1 is a network diagram illustrating an example embodiment of configuring communications between computing nodes belonging to a virtual network, so that the communications are overlaid on one or more intermediate physical networks in a manner transparent to the computing nodes. In this example, the computing nodes are part of a program execution service, and the configuring of communications is facilitated by a system manager module of the program execution service and multiple Communication Manager modules of the program execution service. In other embodiments, the techniques may be used in situations other than with a program execution service, such as with any other use of virtual networks on behalf of one or more entities (e.g., to support multiple virtual networks for different parts of a business or other organization on a private network of the organization).

The illustrated example includes a data center 100 with multiple physical computing systems operated by the program execution service. The data center 100 is connected to a global internet 135 external to the data center 100, which provides access to one or more computing systems 145a via a private network 140, to one or more other globally accessible data centers 160 that each have multiple computing systems, and to one or more other computing systems 145b. The global internet 135 may be, for example, a publicly accessible network of networks, possibly operated by various distinct parties, such as the Internet, and the private network 140 may be, for example, a corporate network that is wholly or partially inaccessible from computing systems external to the private network 140. Computing system 145b may be, for example, a home computing system that connects directly to the Internet (e.g., via a telephone line, cable modem, a Digital Subscriber Line ("DSL"), etc.)

The data center 100 includes a number of physical computing systems 105a-105d and 155a-155n, as well as a Communication Manager module 150 that executes on one or more other computing systems (not shown) to manage communications for the associated computing systems 155a-155n, and a system manager module 110 of the program execution service that executes on one or more computing systems (not shown). In this example, each physical computing system 105a-105d hosts multiple virtual machine computing nodes and includes a virtual machine ("VM") Communication Manager module (e.g., as part of a virtual machine hypervisor monitor for the physical computing system), such as VM Communication Manager module 109a and virtual machines 107a on computing system 105a, and such as VM Communication Manager module 109d and virtual machines 107d on computing system 105d. Physical computing systems 155a-155n do not execute any virtual machines in this example, and thus may each act as a computing node that directly executes one or more software programs on behalf of a customer of the program execution service. In other embodiments, all or none of the physical computing systems at the data center may host virtual machines.

This example data center further includes multiple networking devices, such as switches 115a-115b, edge routers 125a-125c, and core routers 130a-130c. Switch 115a is part of a physical network that includes physical computing systems 105a-105c, and is connected to edge router 125a. Switch 115b is part of a distinct physical network that includes physical computing systems 105d, 155a-155n, and the computing systems providing the Communication Manager module 150 and the system manager module 110, and is connected to edge router 125b. The physical networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more networks. For example, edge router 125a provides a gateway between the physical network established by switch 115a and the interconnection network 120. Edge router 125c provides a gateway between the interconnection network 120 and global Internet 135. The core routers 130a-130c manage communications within the interconnection network 120, such as by forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on network topology, etc.).

The illustrated Communication Manager modules may perform at least some of the described techniques in order to configure, authorize and otherwise manage communications sent to and from associated computing nodes. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay a particular virtual network over one or more intermediate physical networks, such as the interconnection network 120, and optionally the global internet 135 and private network 140 if another Communication Manager module (not shown) manages communications for computing system 145a. Thus, for example, if an organization operating private network 140 desires to virtually extend its private network to one or more of the computing nodes of the data center, it may do by implementing one or more Communication Manager modules as part of the private network 140 (e.g., as part of the interface between the private network 140 and the global internet 135)—in this manner computing systems within the private network (e.g., computing system(s) 145a) may communicate with those data center computing nodes as if those data center computing nodes were part of the private network. In addition, the illustrated Communication Manager modules may authorize communications between computing nodes so as to enhance network isolation and security.

Thus, as one illustrative example, one of the virtual machine computing nodes 107a on computing system 105a may be part of the same virtual local network as one of the virtual machine computing nodes 107d on computing system 105d, with IPv4 being used to represent the virtual network addresses for the virtual local network. That virtual machine 107a may then direct an outgoing communication (not shown) to the destination virtual machine computing node 107d, such as by specifying a virtual network address for that destination virtual machine computing node. The Communication Manager module 109a receives the outgoing communication, and in at least some embodiments determines whether to authorize the sending of the outgoing communication, such as based on previously obtained information about the sending virtual machine computing node 107a and/or about the destination virtual machine computing node 107d (e.g., information about virtual networks and/or entities with which the computing nodes are associated), and/or by dynamically interacting with the system manager module 110 (e.g., to obtain an authorization determination, to obtain some or all such information, etc.). If the Communication Manager module 109a determines that the outgoing communication is authorized (or does not perform such an authorization determination), the module 109a determines the actual physical network location corresponding to the destination virtual network address for the communication (e.g., based on interacting with the system manager module 110)—in this example, the interconnection network uses IPv6 to represent the actual network addresses for computing nodes connected via the interconnection network. The Communication Manager module 109a then re-headers the outgoing communication so that it is directed to Communication Manager module 109d using an actual IPv6 network address, such as if Communication Manager module 109d is associated with a sub-network that includes a range of multiple IPv6 network addresses. For example, the Communication Manager module 109a may determine the actual IPv6 destination network address to use for the virtual network address of the destination virtual machine 107d by dynamically interacting with the system manager module 110, or may have previously determined and stored that information (e.g., in response to a request from the sending virtual machine 107a for information about that destination virtual network address, such as a request using Address Resolution Protocol, or ARP). In this example, the actual IPv6 destination network address that is used includes the virtual destination network address and additional information, as described in greater detail with respect to the examples of FIGS. 2A-2C.

When Communication Manager module 109d receives the communication via the interconnection network 120, it extracts the virtual destination network address and additional information from the actual IPv6 destination network address, and determines to which of the virtual machine computing nodes 107d that the communication is directed. The Communication Manager module 109d next determines whether the communication is authorized for the destination virtual machine computing node 107d, such as by extracting the virtual source network address and additional information from the actual IPv6 source network address, and confirming that the computing node with that virtual source network address is actually managed by the Communication Manager module that forwarded the communication (in this example, Communication Manager module 109a), as discussed in greater detail below. If the communication is determined to be authorized (or the Communication Manager module does not perform such an authorization determination), the Communication Manager module 109d then re-headers the incoming communication so that it is directed to the destination virtual machine computing node 107d using an appropriate IPv4 network address for the virtual network, such as by using the sending virtual machine computing node's virtual network address as the source network address and by using the destination virtual machine computing node's virtual network address as the destination network address. After re-headering the incoming communication, the Communication Manager module 109d then forwards the modified communication to the destination virtual machine computing node. In at least some embodiments, before forwarding the incoming communication to the destination virtual machine, the Communication Manager module 109d may also perform additional steps related to security. For example, the Communication Manager module 109d may verify that the sending virtual machine computing node is authorized to communicate with the destination virtual machine (e.g., based on belonging to the same virtual network, being associated with the same customer or other entity, being associated with different entities whose computing nodes are authorized to intercommunicate, etc.) and/or that the incoming communication is of an allowed type, such as based on information previously obtained by the Communication Manager module 109d or based on interacting with the system manager module 110.

Figure 2A:
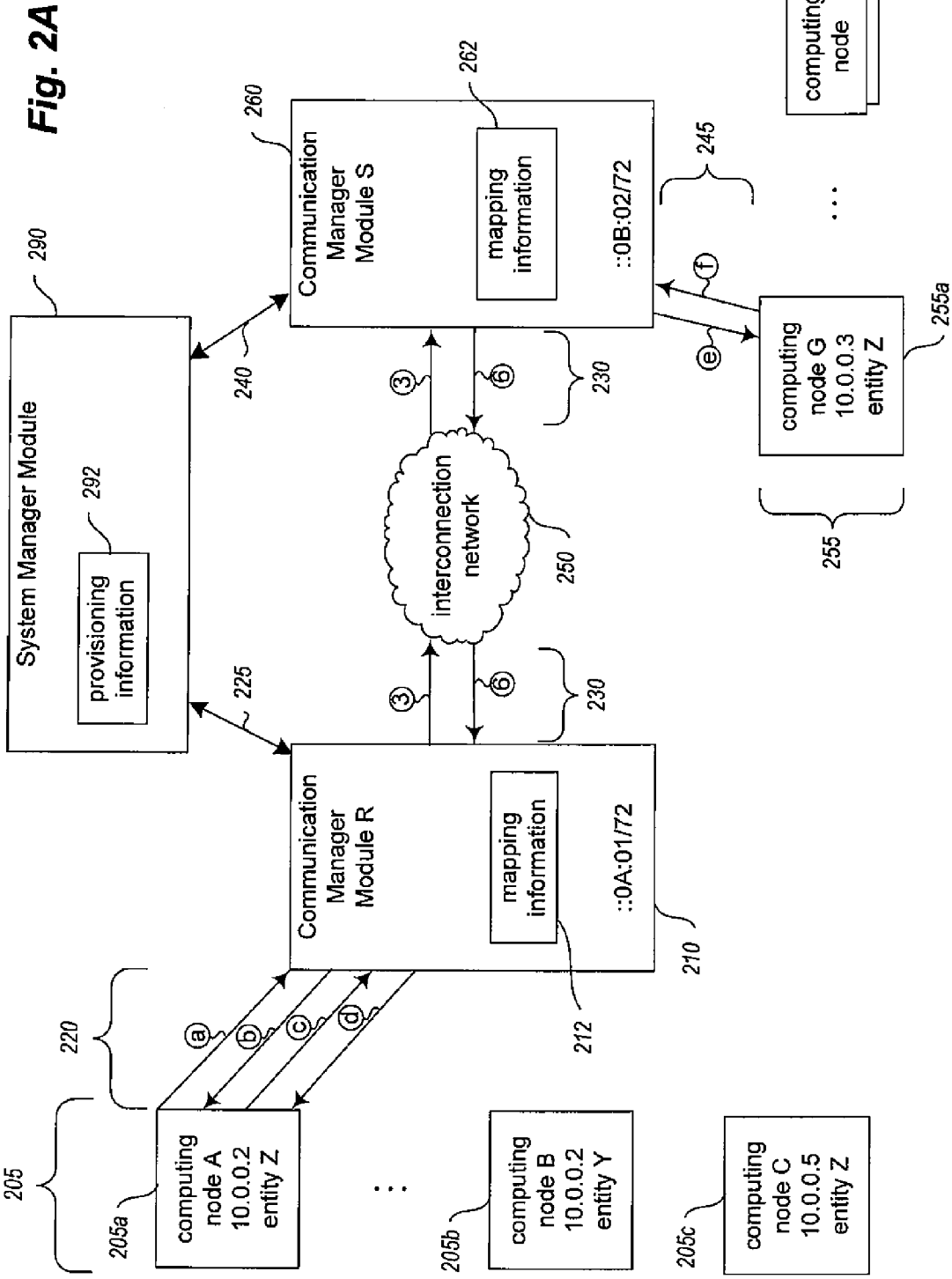
FIGS. 2A and 2B illustrate examples of managing communications between computing nodes that occur via an overlay network.
Figure 2B:
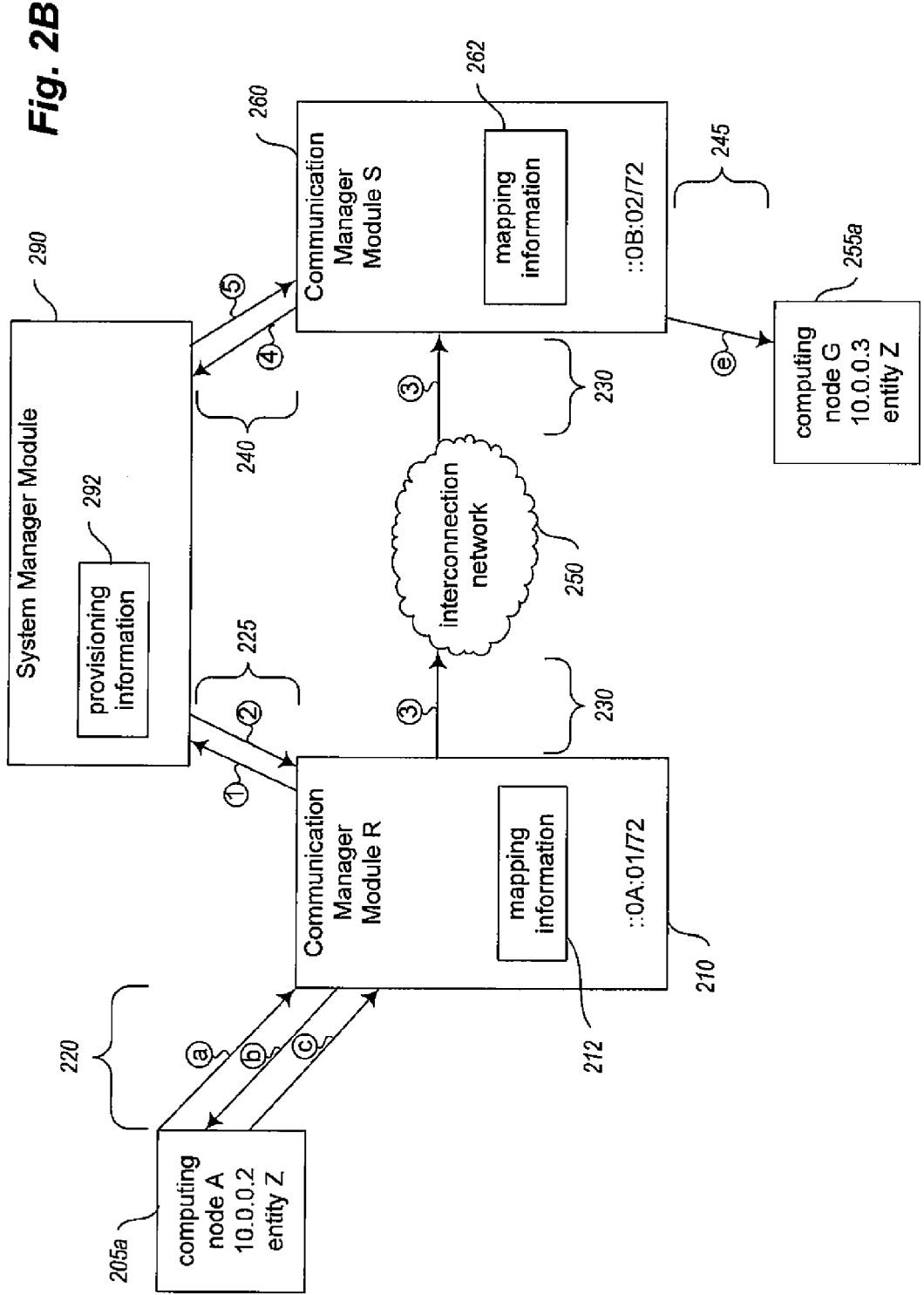

FIGS. 2A and 2B illustrate further examples with additional illustrative details related to managing communications between computing nodes that occur via an overlay network over one or more physical networks, such as may be used by the computing nodes and networks of FIG. 1 or in other situations. In particular, FIG. 2A illustrates various example computing nodes 205 and 255 that may communicate with each other over one or more intermediate interconnection networks 250. In this example embodiment, the computing nodes are operated on behalf of multiple distinct entities, such as multiple customers of a program execution service, and a system manager module 290 manages the association of particular computing nodes with particular entities and virtual networks. The example computing nodes of FIG. 2A include three computing nodes executed on behalf of an example entity Z, those being computing nodes 205a, 205c and 255a. In addition, other computing nodes are operated on behalf of other entities, such as computing node 205b.

In this example, the computing nodes 205 are managed by an associated Communication Manager module R 210, and the computing nodes 255 are managed by an associated Communication Manager module S 260. As one example, computing nodes 205 may each be one of multiple virtual machines hosted by a single physical computing system, and Communication Manager module R may be part of a hypervisor virtual machine monitor for that physical computing system. For example, with reference to FIG. 1, computing nodes 205 could represent the virtual machines 107a, and computing nodes 255 could represent the virtual machines 107d. If so, Communication Manager module R would correspond to Communication Manager module 109a of FIG. 1, Communication Manager module S would correspond to Communication Manager module 109d of FIG. 1, the interconnection network 250 would correspond to interconnection network 120 of FIG. 1, and the system manager module 290 would correspond to system manager module 110 of FIG. 1. Alternatively, computing nodes 205 or 255 may instead each be a distinct physical computing system, such as to correspond to computing systems 155a-155n of FIG. 1.

Each of the Communication Manager modules of FIG. 2A is associated with a sub-network of multiple physical network addresses, which the Communication Manager modules manage on behalf of their associated computing nodes.

For example, Communication Manager module R is shown to be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA: 01FF: FFFF:FFFF:FFFF (representing 2 to the power of 56 unique IPv6 addresses), where each "X" may represent any hexadecimal character that is appropriate for a particular situation (e.g., with the initial 64 bits corresponding a particular organization and network topology, as discussed in greater detail with respect to FIG. 2C). The interconnection network 250 will forward any communication with a destination network address in that range to Communication Manager module R—thus, with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c and 255a are part of a single virtual local network for entity Z, and have assigned IPv4 network addresses of "10.0.0.2", "10.0.0.5" and "10.0.0.3", respectively (if written in dotted hexadecimal form, "10.0.0.2" would instead be "A.0.0.2"). Because computing node 205b is part of a distinct virtual network for entity Y, it can share the same virtual network address as computing node 205a without confusion. In this example, computing node A 205a wants to communicate with computing node G 255a, which it believes is part of a common local physical network with computing node A, as the interconnection network 250 and Communication Manager modules are transparent to computing nodes A and G in this example. In particular, despite the physical separation of computing nodes A and G, the Communication Manager modules 210 and 260 operate so as to overlay the virtual local network for entity Z over the physical interconnection network 250 for communications between those computing nodes, so that the lack of an actual local network is transparent to the computing nodes A and G. In this example, the physical interconnection network 250 is an IPv6 substrate network on which IPv4 virtual networks are overlaid.

In order to send the communication to computing node G, computing node A exchanges various messages 220 with Communication Manager module R 210, despite in the illustrated embodiment being unaware of the existence of Communication Manager module R (i.e., may believe that it is transmitting a broadcast message to all other computing nodes on the local network). In particular, in this example, computing node A first sends an ARP message request 220-a that includes the local network address for computing node G (i.e., "10.0.0.3") and that requests the corresponding hardware address for computing node G (e.g., a 48-bit MAC, or Media Access Control, address). Communication Manager module R intercepts the ARP request 220-a, and responds to computing node A with a spoofed ARP response message 220-b that includes a dummy virtual hardware address for computing node G.

To obtain the dummy virtual hardware address for the response message, the Communication Manager module R first checks a local store 212 of information that maps dummy virtual hardware addresses to corresponding IPv6 actual physical network addresses, with each of the dummy virtual hardware addresses corresponding to an IPv4 virtual network address for a particular entity's virtual network. If the local store 212 does not contain an entry for computing node G (e.g., if none of the computing nodes 205 have previously communicated with computing node G, if a prior entry in local store 212 for computing node G has expired, etc.), the Communication Manager module R interacts 225 with system manager module 290 to obtain the corresponding actual IPv6 physical network address for computing node G on behalf of computing node A. In particular, in this example, the system manager module 290 maintains provisioning information 292 that identifies where each computing node is actually located and to which entity and/or virtual network the computing node belongs, such as by initiating execution of programs on computing nodes for entities and virtual networks or by otherwise obtaining such provisioning information. As discussed in greater detail with respect to FIG. 2B, the system manager module determines whether the request from Communication Manager module R on behalf of computing node A for computing node G's actual IPv6 physical network address is valid, including whether computing node A is authorized to communicate with computing node G, and if so provides that actual IPv6 physical network address.

Communication Manager module R receives the actual IPv6 physical network address for computing node G from the system manager module, and stores this received information as part of a new entry for computing node G as part of mapping information 212 for later use (optionally with an expiration time and/or other information). In addition, Communication Manager module R determines a dummy virtual hardware address to be used for computing node G (e.g., by generating an identifier that is locally unique for the computing nodes managed by Communication Manager module R), stores that dummy virtual hardware address in conjunction with the received actual IPv6 physical network address as part of the new mapping information entry, and provides the dummy virtual hardware address to computing node A as part of response message 220-b. By maintaining such mapping information 212, later communications from computing node A to computing node G may be authorized by Communication Manager module R without further interactions with the system manager module 290, based on the use of the dummy virtual hardware address previously provided by Communication Manager module R.

In other embodiments, Communication Manager module R may interact with system manager module 290 to obtain a physical network address for computing node G or otherwise determine such a physical network address at times other than upon receiving an ARP request, such as in response to any received communication that is directed to computing node G using the virtual network address for entity Z's virtual network. Furthermore, in other embodiments the virtual hardware addresses that are used may differ from this example, such as if the virtual hardware addresses are specified by the system manager module 290, if the virtual hardware addresses are not random and instead store one or more types of information specific to the corresponding computing nodes, etc. In addition, in this example, if computing node A had not been determined to be authorized to send communications to computing node G, whether by the system manager module 290 and/or Communication Manager module R, Communication Manager module R would not send the response message 220-b with the dummy virtual hardware address (e.g., will send no response, will send an error message response, etc.).

In this example, the returned IPv6 actual physical network address corresponding to computing node G in response message 225-2 is "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the virtual local network for entity Z (e.g., as previously assigned by the system manager module to that network to reflect a random number or some other number corresponding to the entity). The initial 72 bits of the IPv6 network address store the "::0B:02" designation, corresponding to the sub-network or other portion of the interconnection network with a network address range of "::0B:02/72" to which Communication Manager module S corresponds—thus, a communication sent over the interconnection network 250 to IPv6 destination network address "::0B:02:<Z-identifier>:10.0.0.3" will be routed to Communication Manager module S. In other embodiments, the entity network identifier may be other lengths (e.g., 32 bits, if Communication Manager module S has a sub-network with a network address range of 64 bits rather than 56 bits) and/or may have other forms (e.g., may be random, may store various types of information, etc.), and the remaining 56 bits used for the network address range of the sub-network may store other types of information (e.g., an identifier for a particular entity, a tag or label for the virtual network, etc.). Additional details related to an example configured IPv6 actual physical network address for use with an overlay network are described with respect to FIG. 2C.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the dummy virtual hardware address provided to computing node A in message 220-b, a source network address for sending computing node A that is "10.0.0.2", and a source hardware address for sending computing node A that is an actual or dummy hardware address that was previously identified to computing node A.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the IPv6 actual physical network address corresponding to that virtual destination hardware address from mapping information 212. As previously noted, the IPv6 actual physical network address in this example is "::06:02:<Z-identifier>:10.0.0.3", and Communication Manager module R creates a new IPv6 header that includes that actual physical network address as the destination address. Similarly, the Communication Manager module R extracts the virtual source network address and virtual source hardware address for computing node A from the header of the received communication, obtains an IPv6 actual physical network address corresponding to that virtual source hardware address (e.g., from a stored entry in mapping information 212, by interacting with the system manager module 290 to obtain that information if not previously obtained, etc.), and includes that actual physical network address as the source network address for the new IPv6 header. In this example, the IPv6 actual physical network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates a new communication 230-3 by modifying communication 220-c so as to replace the prior IPv4 header with the new IPv6 header (e.g., in accordance with SIIT), including populating the new IPv6 header with other information as appropriate for the new communication (e.g., payload length, traffic class packet priority, etc.). Thus, the new communication 230-3 includes the same content or payload as prior communication 220-c, without encapsulating the prior communication 220-c within the new communication 230-3. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the source and/or destination virtual hardware address used in communication 220-c. In other embodiments, such an authorization determination may not be performed by Communication Manager module R for each outgoing communication, or instead may be performed in other manners (e.g., based on a determination that the sending node and destination node are part of the same virtual network or are associated with the same entity or are otherwise authorized to inter-communicate, based on an interaction with system manager module 290 to obtain an authorization determination for the communication, etc.).

After Communication Manager module R forwards the modified communication 230-3 to the interconnection network 250, the interconnection network uses the physical IPv6 destination network address of the communication to route the communication to Communication Manager module S. In doing so, the devices of the interconnection network 250 do not use the portion of the destination network address that includes the embedded entity network identifier or embedded virtual network address, and thus do not need any special configuration to forward such a communication, nor even awareness that a virtual network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the system manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates a new communication 245-*e* by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a dummy virtual hardware address for computing node A as the source network address and source hardware address for the new IPv4 header, and includes other information as appropriate for the new communication (e.g., total length, header checksum, etc.). The dummy virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the new communication 245-*e* includes the same content or payload as prior communication 220-*c* and 230-3. Communication Manager module S then forwards new communication 245-*e* to computing node G.

After receiving communication 245-*e*, computing node G determines to send a response communication 245-*f* to computing node A, using the source virtual network address and source virtual hardware address for computing node A from communication 245-*e*. Communication Manager module S receives communication 245-*e*, and processes it in a manner similar to that previously described with respect to communication 220-*c* and Communication Manager module R. In particular, Communication Manager module S optionally verifies that computing node G is authorized to send communications to computing node A, and then modifies communication 245-*f* to create communication 230-6 by generating a new IPv6 header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent by computing node G, and then modifies communication 230-6 to create communication 220-*d* by generating a new IPv4 header using mapping information 212. Communication Manager module R then forwards communication 220-*d* to computing node A.

In this manner, computing nodes A and G may intercommunicate using a IPv4-based virtual local network, without any special configuration of those computing nodes to handle the actual intervening IPv6-based substrate interconnection network, and interconnection network 250 may forward IPv6 communications without any special configuration of any networking devices of the interconnection network, based on the Communication Manager modules overlaying the virtual local network over the actual physical interconnection network without encapsulation of communications and on using embedded virtual network addresses in the substrate physical network addresses.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling Layer-2 raw encapsulated communications. Similarly, for link-local broadcast and multicast communications, a special multicast group /64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition, it will be appreciated that a Communication Manager module may facilitate communications between multiple of the computing nodes that are associated with that Communication Manager module. For example, with respect to FIG. 2A, computing node 205*a* may wish to send an additional communication (not shown) to computing node 205*c*. If so, Communication Manager module R would perform actions similar to those previously described with respect to the handling of outgoing communication 220-*c* by Communication Manager module R and the handling of incoming communication 230-3 by Communication Manager module S, but without re-headering of the additional communication to use an IPv6 header since the communication will not travel over the interconnection network.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a virtual network for that entity, and may further have one or more other non-managed computing systems (e.g., computing systems that are directly connected to the interconnection network 250 and/or that natively use IPv6 network addressing) that do not have an associated Communication Manager module that manages their communications. If the entity desires that those non-managed computing systems be part of that virtual network or otherwise communicate with the managed computing nodes of the virtual network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>:10.0.0.2" for managed computing node A in this example), the non-managed computing system may send communications to computing node A via interconnection network 250 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R could generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual networks may be configured to allow communications with other devices that are not part of the virtual network, such as other non-managed computing systems or other types of network appliance devices that do not have an associated Communication Manager module that manages their communications. In such situations, if the managed computing nodes and/or the virtual network is configured to allow communications with such other non-managed devices, such a non-managed device may similarly be provided with the actual IPv6 destination network address for such a computing node (e.g., "::0A:01:<Z-identifier>:10.0.0.2" for computing node A in this example), allowing the non-managed device to send communications to computing node A via interconnection network 250 using that destination network address, with Communication Manager module R then forwarding those communications to computing node A (e.g., after re-headering the communications in a manner similar to that previously described). Furthermore, Communication Manager module R could similarly manage outgoing communications from computing node A to such a non-managed device to allow computing node A to send such communications.

In addition, as previously noted, a Communication Manager module manages communications for associated computing nodes in various ways, including in some embodiments by assigning virtual network addresses to computing nodes of a virtual network address, and/or by assigning substrate physical network addresses to managed computing nodes from a range of substrate physical network addresses that correspond to the Communication Manager module. In other embodiments, some such activities may instead be performed by one or more computing nodes of the virtual network, such as to allow a DHCP (Dynamic Host Configuration Protocol) server or other device of a virtual network to specify virtual network addresses and/or substrate physical network addresses to particular computing nodes of the virtual network. In such embodiments, the Communication Manager module obtains such configuration information from the virtual network device(s), and updates its mapping information accordingly (and in some embodiments may further update one or more system manager modules that maintain information about computing nodes associated with virtual networks).

In addition, in some embodiments and situations, a managed computing node may itself be treated as a virtual router or phantom router, with multiple virtual network addresses associated with that managed computing node, and with that managed computing node forwarding communications to other computing nodes that correspond to those multiple virtual network addresses. In such embodiments, the Communication Manager module that manages communications for that managed computing node router handles communications to and from that computing node in a manner similar to that previously described. However, the Communication Manager module is configured with the multiple virtual network addresses that correspond to the managed computing node router, so that incoming communications to any of those multiple virtual network addresses are forwarded to the managed computing node router, and so that outgoing communications from the managed computing node router are given a substrate source physical network address that corresponds to the particular computing node that sent the communication via the managed computing node router. In this manner, physical routers or other networking devices of a particular customer or other entity may be virtually represented for a virtual network implemented for that entity.

FIG. 2B illustrates some of the computing nodes and communications discussed with respect to FIG. 2A, but provides additional details with respect to some actions taken by the Communication Manager modules 210 and 260 and/or the system manager module 290 to authorize communications between computing nodes. For example, after computing node A sends message 220-a to request a hardware address for computing node G, Communication Manager module R may perform one or more interactions 225 with the system manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained that information and it remains valid (e.g., has not expired), then the interactions 225 may not be performed. In this example, to obtain the desired physical network address corresponding to computing node G, Communication Manager module R sends a message 225-1 to the system manager module 290 that includes the virtual network addresses for computing nodes A and G, and that includes an entity network identifier for each of the computing nodes, which in this example is an entity network identifier for entity Z (e.g., a 32-bit or 24-bit unique identifier,). In at least some embodiments, Communication Manager module R may send message 225-1 to the system manager module 290 using an anycast addressing and routing scheme, so that multiple system manager modules may be implemented (e.g., one for each data center that includes Communication Manager modules and associated computing nodes) and an appropriate one of those (e.g., the nearest, the most underutilized, etc.) is selected to receive and handle the message. After the system manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the system manager module 290 returns a response message 225-2 that includes the desired actual physical network address corresponding to computing node G. In addition, in at least some embodiments, before sending the desired actual physical network address, the system manager module 290 may further verify that Communication Manager module R is authorized to send the message 225-1 on behalf of computing node A, such as based on computing node A being one of the computing nodes to which Communication Manager module R is associated.

In other embodiments, Communication Manager module R may perform some or all of the actions described as being performed by system manager module 290, such as to maintain provisioning information for the various computing nodes and/or to determine whether computing node A is authorized to send communications to computing node G, or instead no such authorization determination may be performed in some or all situations. Furthermore, in other embodiments other types of authorization determination may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the system manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with system manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the system manager module 290 using an anycast addressing and routing scheme.

The system manager module 290 receives message 240-4, and returns a response message 240-5 that includes the actual physical network address corresponding to computing node A, which in this example is "::0A:01:<Z-identifier>: 10.0.0.2". As previously discussed with respect to messages 225-1 and 225-2, in some embodiments the system manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in message 240-5 matches the source IPv6 network address extracted from the header of communication 230-3, so as to prevent attempts to spoof messages as being from computing node A that are actually sent from other computing nodes in other locations. Communication Manager module S optionally stores this received information in message 240-5 as part of an entry for computing node A in mapping information 262 for later use, along with computing node A's virtual network address and a dummy virtual hardware address for computing node A.

Various other types of actions than those discussed with respect to FIGS. 2A-2B may be performed in other embodiments, including for types of network addressing protocols other than IPv4 and IPv6.

Figure 2C:
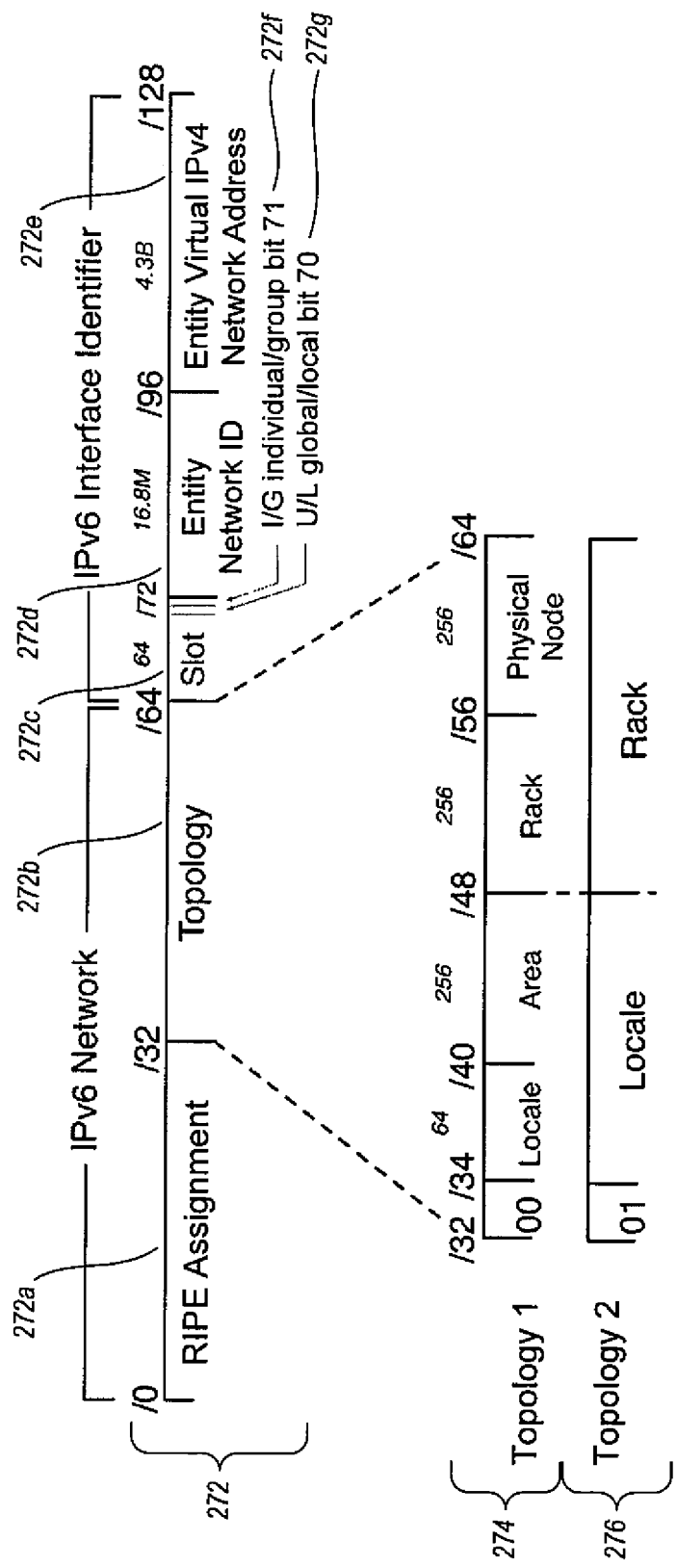
FIG. 2C illustrates an example of configuring underlying substrate network addresses so as to enable embedding of virtual network addresses for an overlay network.

FIG. 2C illustrates an example IPv6 physical substrate network address configuration 272 for use with the described techniques, with the example network address being configured so as to embed a virtual network address and other information in the substrate network address so as to enable an overlay network over the substrate network. As previously discussed, this example IPv6 network address configuration uses the 128-bit network address space to store various information, with the initial 64 bits storing an IPv6 network portion of the address, and with the subsequent 64 bits storing an interface identifier (or "host") portion of the address.

In this example, the initial 64-bit network portion of the IPv6 address includes a 32-bit identifier 272a for bits 0 through 31 that corresponds to a corporate or other organization identifier assigned to such an organization by an Internet registry operator on behalf of the Internet Assigned Numbers Authority (in this example, based on an assignment from the Regional Internet Registry RIPE NNC, or Réseaux IP Européens Network Coordination Centre). For example, in some embodiments, an organization that operates a program execution service or other organization that uses the described techniques may have an associated identifier 272a. The initial 64-bit network portion of the address also includes a 32-bit group of information 272b in this example that corresponds to topology of a group of multiple computing nodes (e.g., a sub-network or other network portion) provided on behalf of the group whose identifier is indicated in information 272a. As previously discussed, in at least some embodiments, the initial 64-bit network portion of the address represents a partial network address for the substrate network that corresponds to a location of multiple related computing nodes, such as a sub-network or other portion of the substrate network. In particular, the initial 64-bit network address portion in at least some embodiments corresponds to a particular Communication Manager module that represents multiple associated computing nodes being managed by the Communication Manager module, such as based on the Communication Manager module managing the range of network addresses corresponding to some or all of the 64-bit interface identifier address portion in order to represent the various managed computing nodes. In other embodiments, the partial network address may be represented with a different number of bits (e.g., 72) and/or using a part of the address other than a prefix.

The 32-bit group of topology information 272b may represent various information in various ways in different embodiments, with topology information groups 274 and 276 showing two alternative example configurations of topology information. In particular, in the examples of 274 and 276, the first two bits (bits 32 and 33 of the overall IPv6 address) indicate a particular version of the topology information, such that the meaning of the remaining 30 bits may change over time. With respect to example 274, various bits as shown each indicate different geographical locales, geographic areas within the locales, computer racks within the geographic areas, and physical computing system nodes within the computer racks. In this example, the 6 bits for the locale information may represent 64 unique values, the 8 bits for the area information may represent 256 unique values for each locale value, the 8 bits for the rack information may represent 256 unique values for each area value, and the 8 bits for the physical computing system node information may represent 256 unique values for each rack value. Conversely, with respect to example 276, only locale and rack information is shown, but each have additional bits in order to represent those types of information, such as to have 16,384 unique locale values using its 14 bits, and to have 65,536 unique rack values using its 16 bits for each locale value. It will be appreciated that topology information may be represented in other manners in other embodiments.

In this example, the 64-bit interface identifier portion of the IPv6 address is configured to store several types of information, including an 6-bit identifier 272c that corresponds to a particular computing node slot (e.g., a particular virtual machine computing node on a particular physical computing system that corresponds to the initial 64-bit network portion of the IPv6 address), two 1-bit identifiers 272f and 272g, a 24-bit identifier 272d to embed an entity network identifier (e.g., to reference a particular virtual network), and a 32-bit identifier 272e to embed an IPv4 network address (e.g., a virtual network address). The 6 bits for the slot identifier may represent approximately 64 unique values, the 24 bits for the embedded entity network identifier may represent approximately 16.8 million unique values, and the 32 bits for the embedded IPv4 network address may represent approximately 4.3 billion unique values. In this example, the 1-bit identifier 272g (bit 70 of the IPv6 address) represents a U/L global/local bit that in some embodiments may indicate whether the address is globally administered or locally administered, and the 1-bit identifier 272f (bit 71 of the IPv6 address) represents an I/G individual/group bit that in some embodiments may indicate whether the address corresponds to a single computing node or to a group of multiple computing nodes (e.g., as part of a broadcast or multicast). In at least some embodiments, the I/G bit is set to zero, and the U/L bit is set to one when virtual forwarding of the corresponding communication is being used, such as for use in virtual subnetting via phantom computing node routers and/or to indicate that an incoming communication with such a destination address be delivered to a computing node corresponding to the value of the 6-bit slot identifier rather than a computing node corresponding to the values of the 32-bit IPv4 embedded network address and 24-bit entity network identifier. It will be appreciated that the interface identifier information may be represented in other manners in other embodiments.

Figure 3:
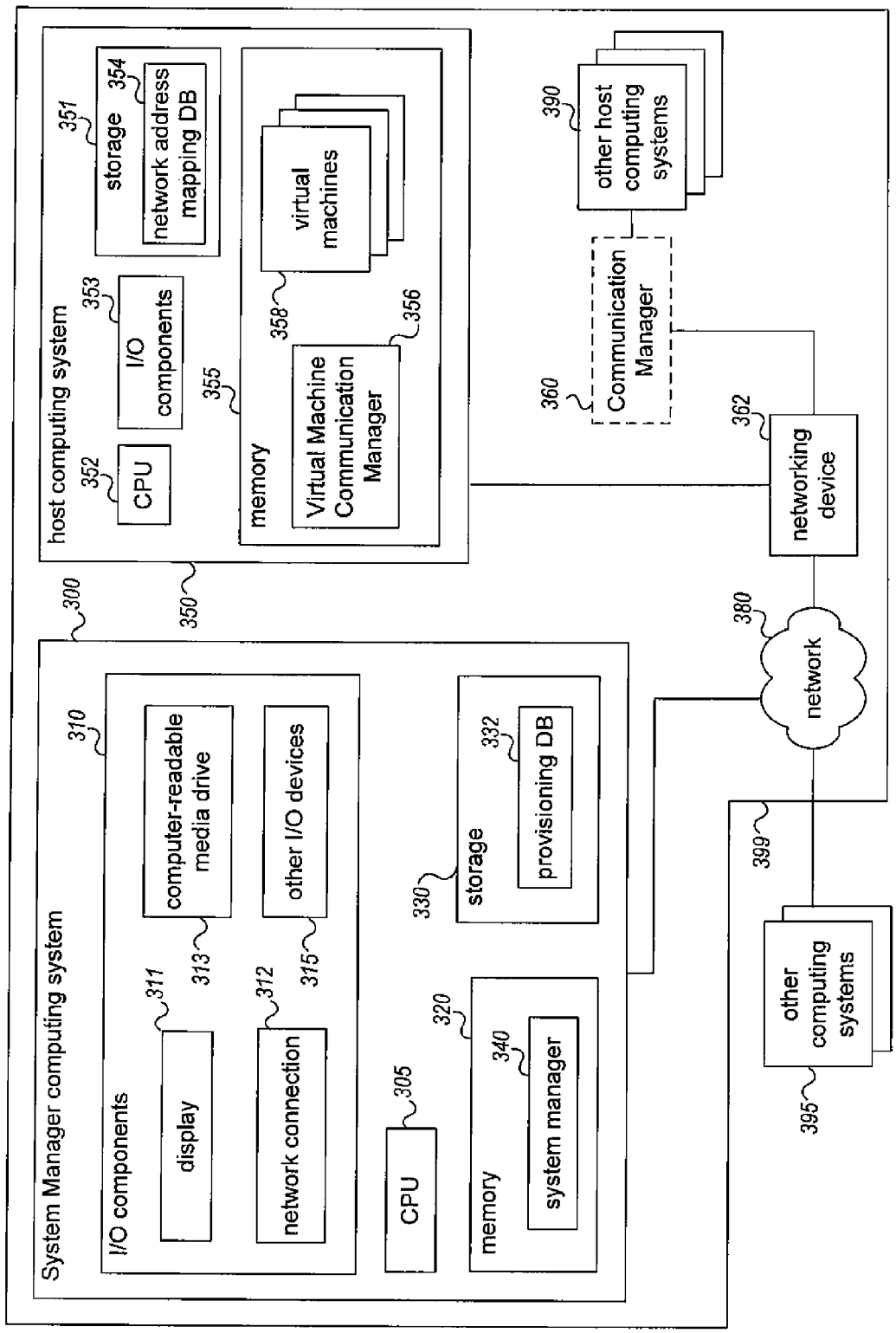
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by a program execution service that executes programs on behalf of customers or other entities. The group 399 includes a system manager computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The system manager computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as computing systems 395. In the illustrated example, the networking device 362 provides a gateway between the network 380 and host computing systems 350 and 390. In some embodiments, networking device 362 may, for example, be a router or a bridge.

The system manager computing system 300 functions to manage the configuration of virtual networks within the group 399, as well as to provide other functions related to the provisioning, initialization, and execution of programs on computing nodes. The system manager computing system 300 includes a CPU 305, various I/O components 310, storage 330, and memory 320. The I/O components include a display 311, network connection 312, computer-readable media drive 313, and other I/O devices 315 (e.g., a mouse, keyboard, etc.).

The host computing system 350 functions to host one or more virtual machines, such as to operate as computing nodes that execute programs on behalf of various customers. The host computing system 350 includes a CPU 352, various I/O components 353, storage 351, and memory 355. A virtual machine Communication Manager module 356 and one or more virtual machines 358 are executing in the memory 355, with the module 356 managing communications for the associated virtual machine computing nodes 358. The Communication Manager module 356 maintains various mapping information 354 on storage related to the computing nodes 358 and other computing nodes, such as in a manner similar to mapping information 212 and 262 of FIGS. 2A-2B. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical networks.

An embodiment of a system manager module 340 is executing in memory 320 of the computing system 300. In some embodiments, the system manager 340 may receive an indication of one or more programs to be executed as part of one or more virtual machine computing nodes on host computing system 350 or otherwise as one or more computing nodes using one of the host computing systems 390, and in some situations may select the computing node(s) that will execute the program(s). The system manager 340 may then determine a virtual network associated with the computing node(s) based on, for example, a customer identity associated with the program and/or other factors. In some cases, the structure and/or membership of various virtual networks may be provided by the provisioning database 332, which the module 340 maintains to store information related to the physical and virtual resources (e.g., networking, hardware, etc.) associated with various customers and/or executing programs and computing nodes. The system manager module 340 then initiates execution of the program(s) on the computing node(s), and optionally provides information to the Communication Manager modules associated with those computing nodes regarding virtual networks and/or entities to which those computing nodes are associated. In other embodiments, the execution of programs on computing nodes may be initiated in other manners, and the system manager module 340 may instead merely receive and maintain information about those computing nodes, programs, associated entities and associated virtual networks.

As discussed in greater detail elsewhere, the Communication Manager modules 356 and 360 (and other Communication Manager modules, not shown, that manage other associated computing nodes, not shown) and the system manager module 340 may interact in various ways to manage communications between computing nodes. Such interactions may, for example, enable the computing nodes 358 and/or other computing nodes to inter-communicate over virtual networks without any special configuration of the computing nodes, by overlaying the virtual networks over network 380 and optionally one or more external networks (not shown) without any special configuration of networking device 362 or other networking devices (not shown), and without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
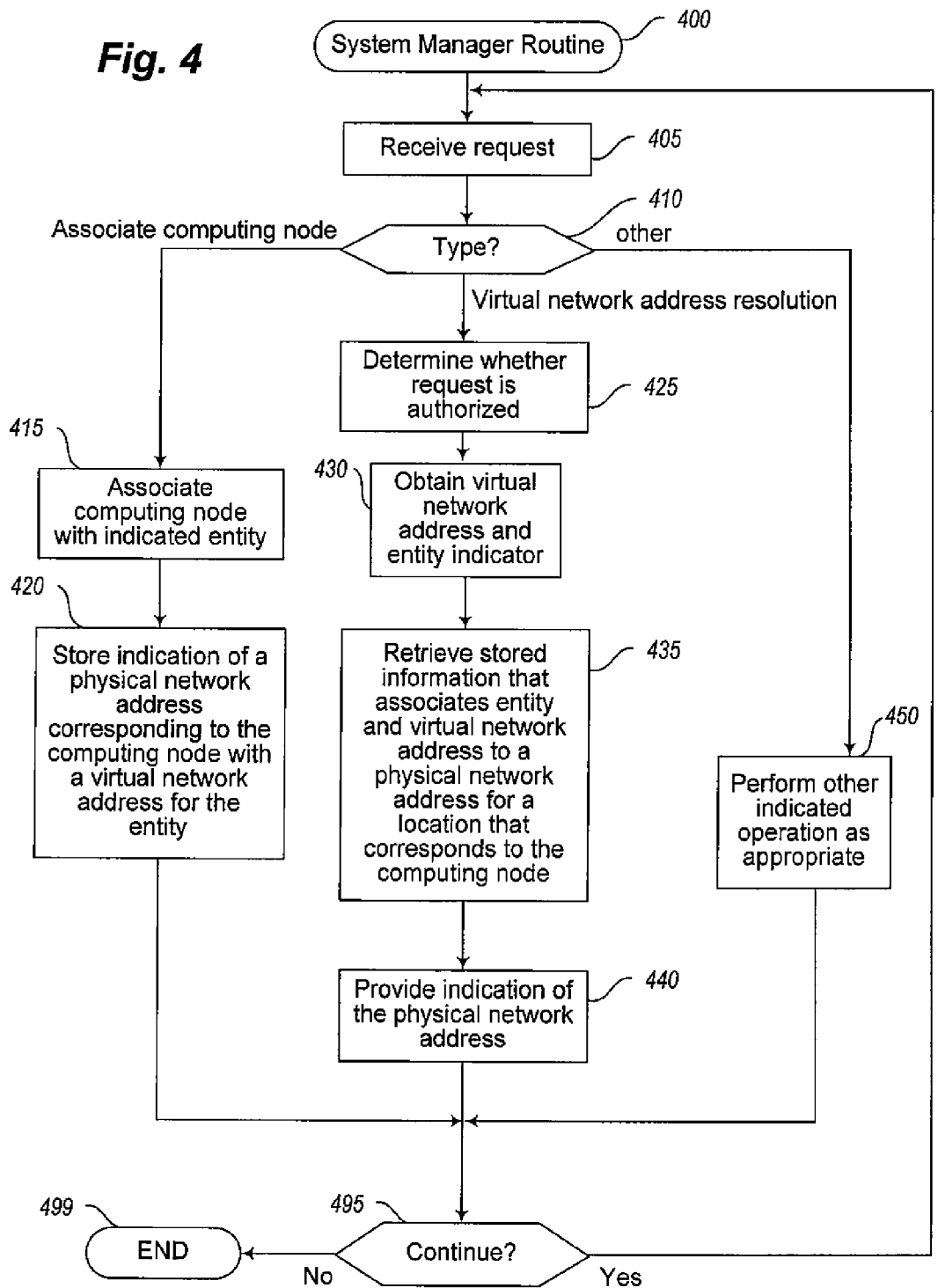
FIG. 4 illustrates a flow diagram of an example embodiment of a System Manager routine.

FIG. 4 is a flowchart of an example embodiment of a System Manager routine 400. The routine may be provided by, for example, execution of the system manager module 110 of FIG. 1, the system manager module 290 of FIGS. 2A-2B, and/or the system manager module 340 of FIG. 3, such as to assist in managing communications between multiple computing nodes across one or more intermediate networks, as well as to perform other types of management operations in some situations. In at least some embodiments, the routine may be provided as part of a system that configures communications for multiple different entities across a common intermediate network, such as part of a program execution service that executes programs on distributed computing nodes for multiple customers, with the communications configured so as to enable each computing node to transparently communicate with other associated computing nodes using a private virtual local network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate a computing node with a particular indicated entity, such as if that computing node is executing or is to execute one or more programs on behalf of that entity, the routine continues to block 415 to associate that computing node with that indicated entity. In some embodiments, the routine may further determine the one or more computing nodes to be associated with the indicated entity, such as based on information provided by the indicated entity regarding one or more programs whose execution is to be initiated, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store an indication of the computing node and its association with the indicated entity. In particular, in the illustrated embodiment the routine stores an indication of a physical network address corresponding to the computing node, a virtual network address used by the entity for the computing node, and an indication of the associated entity. As discussed in greater detail elsewhere, the physical network address corresponding to the computing node may in some embodiments be a physical network address specific to that single computing node, while in other embodiments may instead refer to a sub-network or other group of multiple computing nodes, such as may be managed by an associated Communication Manager module. Furthermore, in situations in which a particular entity has multiple distinct virtual networks, the routine may receive an indication of or otherwise determine the one or more virtual networks with which the computing node is associated, and similarly store that information in conjunction with other information about the computing node. As previously discussed, FIG. 2C illustrates one example of how such a physical network address may be configured.

If it is instead determined in block 410 that the type of received request is a request for address resolution for a virtual network address of a computing node, such as from a Communication Manager module on behalf of another managed computing node, the routine continues instead to block 425, where it determines whether the request is authorized in one or more ways, such as based on whether the managed computing node on whose behalf the request is made is authorized to send communications to the computing node whose virtual network address resolution is requested (e.g., based on the virtual network(s) to which the two computing nodes belong), based on whether the managed computing node on whose behalf the request is made is a valid computing node that is currently part of a configured virtual network, and/or based on whether the request is received from the Communication Manager module that actually manages the indicated computing node on whose behalf the request is made. If the request is determined to be authorized, the routine continues to block 430, where it obtains a virtual network address of interest and an entity network identifier or other indicator of the entity (e.g., a unique numeric or alphanumeric label), such as included with the request received in block 405. The routine then continues to block 435 to retrieve stored information that associates that virtual network address for the virtual network corresponding to that entity network identifier to a physical network address for a location that corresponds to the computing node, such as may be previously stored with respect to block 420. After block 435, the routine continues to 440 to provide an indication of the physical network address to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is of another type, the routine continues instead to block 450 to perform another indicated operation as appropriate. For example, in some embodiments, the routine may receive requests to update stored information about particular computing nodes, such as if a particular computing node was previously associated with a particular entity and/or virtual network but that association ends (e.g., one or more programs being executed for that entity on that computing node are terminated). The routine may also perform a variety of other actions related to managing a system of multiple computing nodes, as discussed in greater detail elsewhere. In addition, while not illustrated here, in other embodiments the routine may at times perform actions of other types, such as to perform occasional housekeeping operations to review and update stored information as appropriate, such as after predefined periods of time have expired. In addition, if possible validation problems are detected, such as with respect to received address resolution requests for virtual network addresses, the routine may take various actions to signal an error and/or perform other corresponding actions as appropriate.

After blocks 420, 440, and 450, the routine continues to block 495 to determine whether to continue. If so, the routine returns to block 405, and if not continues to block 499 and ends.

Figure 5:
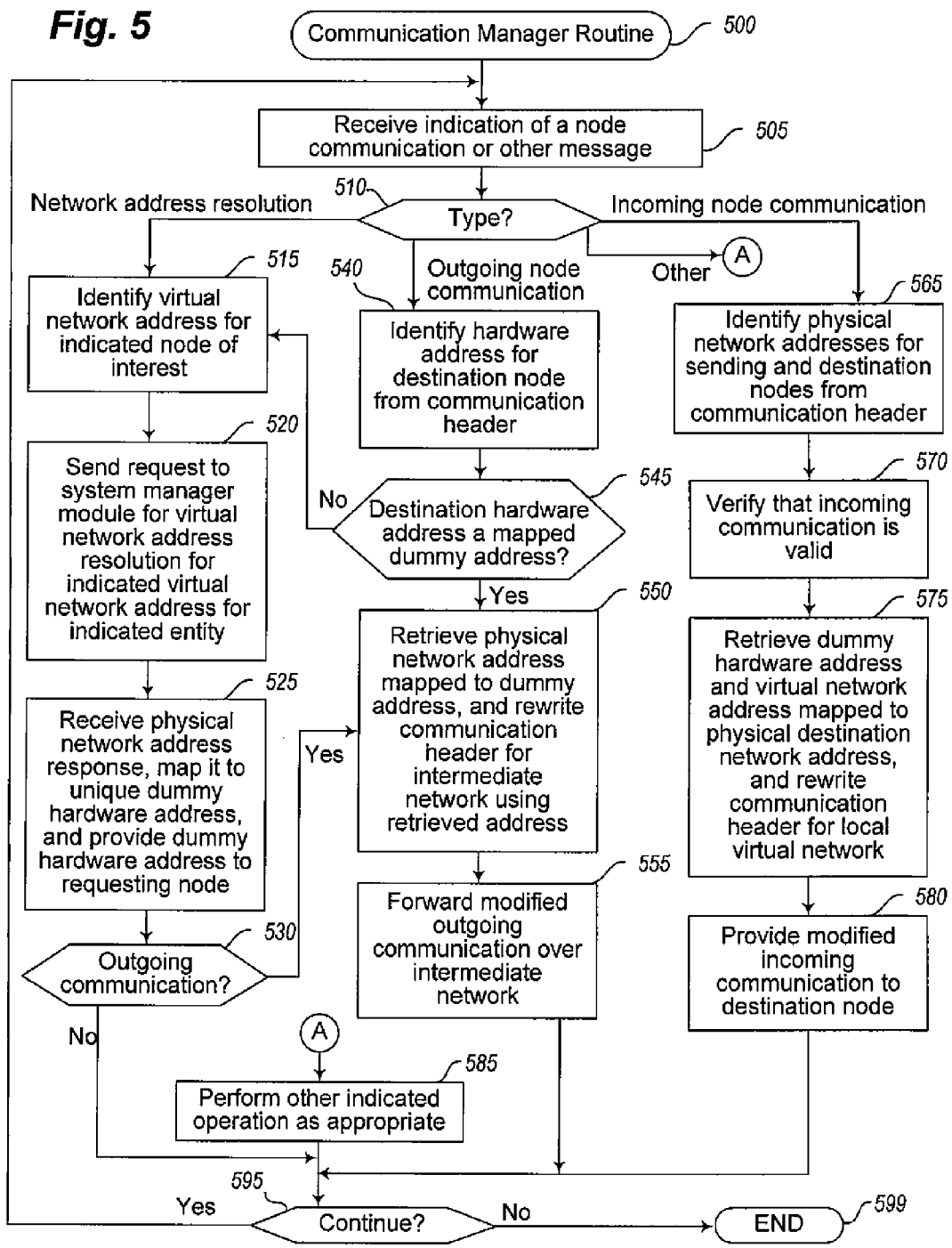
FIG. 5 illustrates a flow diagram of an example embodiment of a Communication Manager routine.

FIG. 5 is a flow diagram of an example embodiment of a Communication Manager routine 500. The routine may be provided by, for example, execution of the Communication Manager modules 109a, 109d and/or 150 of FIG. 1, the Communication Manager modules 210 and/or 260 of FIGS. 2A-2B, and/or the Communication Manager modules 356 and/or 360 of FIG. 3, such as to manage communications to and from an associated group of one or more computing nodes in order to provide a private virtual network over one or more shared intermediate networks, including to determine whether to authorize communications to and/or from the managed computing nodes.

The routine beings at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request. The routine then continues to block 520 to send a request to a system manager module for virtual network address resolution for the indicated virtual network address for the virtual network (or alternatively, entity) associated with the computing node that provided the request, such as discussed with respect to blocks 425-440 of FIG. 4. As discussed in greater detail elsewhere, the routine may in some embodiments track information about virtual networks and/or entities associated with each managed computing node, while in other embodiments such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular Communication Manager module provides an address resolution request for another computing node that is also managed by that Communication Manager module, the routine may instead be able to respond to the request without interaction with the system manager module, such as based on information stored locally by the routine. In addition, while in the illustrated embodiment the received request is a request to provide a computing node's link-layer hardware address that corresponds to an indicated network-layer address, in other embodiments the address resolution request may have other forms.

In the illustrated embodiment, the routine next continues to block 525 to receive a response from the system manager module that includes a physical network address, and stores information locally that maps that physical network address to a unique dummy hardware address for later use by the routine (e.g., based on a dummy virtual hardware address generated by the routine or provided in the response). As previously discussed, FIG. 2C illustrates one example of how such a physical network address may be configured. The routine then provides the dummy hardware address to the requesting computing node, which it will use as part of communications that it sends to the computing node with the indicated virtual network address. As discussed in greater detail elsewhere, the physical network address response that is provided may in some embodiments include a physical network address that is specific to the indicated computing node of interest, while in other embodiments the physical network address may correspond to a sub-network or other group of multiple computing nodes to which the indicated computing node belongs, such as to correspond to another Communication Manager module that manages those other computing nodes. The routine then continues to block 530 to determine if blocks 515-525 were performed as part of the handling of an outgoing node communication, as discussed with respect to blocks 540-555, and if so, continues to block 550. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote destination computing node that is not managed by the routine, the routine continues to block 540 to identify the indicated hardware address for the destination computing node from the communication header. In block 545, the routine then determines whether that destination hardware address is a dummy hardware address previously mapped to a physical network address corresponding to the destination computing node, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped dummy address, the routine may cause the outgoing node communication to fail, such as with an error message back to the sending node). If the indicated hardware address is a mapped dummy address, or the check is not performed, the routine continues to block 550 to retrieve the physical network address that is mapped to the dummy hardware address, and rewrites the communication header in accordance with a networking address protocol for one or more intermediate networks between the sending and destination computing nodes using the retrieved address. As previously discussed, FIG. 2C illustrates one example of how such a physical network address may be configured. The header re-writing may further include changing other information in the new header, including changing a virtual network address for the sending computing node to be a corresponding physical network address, and in at least some embodiments includes modifying the received communication without encapsulation as part of an overlay of the virtual network over the one or more intermediate physical networks. In block 555, the routine then facilitates providing of the modified outgoing communication to the destination computing node, such as by initiating forwarding of the modified outgoing communication over the intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual network, based on the sending and designation computing nodes being associated with different entities that are authorized to inter-communicate, based on the type of communication or other information specific to the communication, etc.).

If it is instead determined in block 510 that the received message is an incoming node communication for one of the managed computing nodes from an external computing node, the routine continues to block 565 to identify the physical network addresses for the sending and destination computing nodes from the communication header. As previously discussed, FIG. 2C illustrates one example of how such a physical network address may be configured. After block 565, the routine continues to block 570 to optionally verify that the incoming communication is valid in one or more ways. For example, the routine may determine whether the physical network address for the sending communication node is actually mapped to a computing node that corresponds to the source physical network address location, such as based on interactions with a system manager module and/or based on other information previously obtained and stored by the routine. In addition, the routine may determine whether the physical network address for the destination communication node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node. If the indicated destination network address corresponds to a computing node that was recently managed but is not currently managed (e.g., due to that computing node no longer being associated with the indicated virtual network, such as due to no longer executing one or more programs on behalf of a corresponding entity), the routine may provide an indication to the sending computing node that the destination computing node is no longer available.

In the illustrated embodiment, after block 570, the routine continues to block 575 to retrieve the dummy hardware address and the virtual network address that are mapped to the physical destination network address, and rewrite the communication header for the virtual local network so that it appears to be sent to a computing node with that virtual network address and dummy hardware address. For example, in some embodiments the destination virtual network address may be obtained from the destination physical network address itself, such as from a subset of the bits of the destination physical network address. In addition, the dummy destination hardware address may have previously been mapped to the physical destination network address, such as previously discussed with respect to block 525. In situations in which such prior mapping has not occurred, the routine may instead perform blocks 515-525 to obtain such information. The routine may similarly rewrite the communication header for the virtual local network so that it appears to be sent from a computing node with a source virtual network address and dummy source hardware address corresponding to the sending computing node. After block 575, the routine continues to block 580 to facilitate providing of the modified incoming communication to the destination computing node, such as by initiating forwarding of the modified incoming communication to the destination node.

If it is instead determined in block 510 that a message of another type is received, the routine continues to block 585 to perform another indicated operation as appropriate, such as to store information about entities associated with particular computing nodes, update previously mapped or stored information to reflect changes with respect to computing nodes that are being managed or to remote computing nodes, etc.

After blocks 555, 580, or 585, or if it is instead determined in block 530 that the processing is not being performed with respect to an outgoing communication, the routine continues to block 595 to determine whether to continue. If so, the routine returns to block 505, and if not continues to block 599 and ends.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual networks and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In addition, some embodiments may provide an API ("application programming interface") that allows other computing systems and programs to programmatically invoke at least some of the described functionality. Such APIs may be provided by libraries or class interfaces (e.g., to be invoked by programs written in C, C++, or Java) and/or network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" and U.S. application Ser. No. 11/692,038, filed Mar. 27, 2007 and entitled "Configuring Intercommunications Between Computing Nodes;" each of which is incorporated herein by reference in its entirety.

It will also be appreciated that, although in some embodiments the described techniques are employed in the context of a data center housing multiple physical machines hosting virtual machines and/or in the context of a program execution service, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   storing, on a computer system, mapping information that associates a virtual Internet Protocol (IP) address of a first node with a substrate IP address of the first node, wherein the computer system provides a second node that is part of a virtual computer network overlaid on a substrate network, and wherein the substrate IP address is for use within the substrate network;
   modifying, by a second computer system that provides the first node and for an outgoing communication from the first node to the second node that includes the virtual IP address for the first node, the outgoing communication to include the substrate IP address of the first node by using mapping information stored on the second computer system, wherein the modifying is performed before forwarding the modified outgoing communication over the substrate network;
   retrieving, by the computer system and from information included in a received communication after the communication is forwarded over the substrate network from the first node to the second node, the virtual IP address for the first node and the substrate IP address for the first node, wherein the received communication is the modified outgoing communication;
   determining, by the computer system, that the received communication is authorized for the second node by using the stored mapping information to match the retrieved virtual IP address for the first node with the retrieved substrate IP address for the first node; and
   initiating, by the computer system and based on the determining that the received communication is authorized, providing of the received communication to the second node.

2. The computer-implemented method of claim 1 further comprising:
   receiving, by the computer system, the communication forwarded over the substrate network in a format for transmission over the substrate network; and
   modifying, by the computer system, the received communication to be formatted for the virtual computer network,
   and wherein the communication provided to the second node is the modified communication.

3. The computer-implemented method of claim 2 wherein the first node is further part of the virtual computer network, wherein the received communication forwarded over the substrate network includes the substrate IP address of the first node as a specified source of the received communication, and wherein the modifying of the received communication includes specifying a source of the modified communication to be the virtual IP address of the first node.

4. The computer-implemented method of claim 2 further comprising executing, by the computer system, a destination communication manager module that assists in implementing the virtual computer network, and wherein the determining that the received communication is authorized is performed by the executing destination communication manager module.

5. The computer-implemented method of claim 1 wherein the virtual IP address of the first node is stored in a header of the received communication forwarded over the substrate network, and wherein the retrieving of the virtual IP address from the information included in the received communication includes extracting the stored virtual IP address from the header.

6. The computer-implemented method of claim 5 wherein the communication forwarded over the substrate network uses the substrate IP address of the first node as a source IP address for the forwarded communication, wherein the virtual IP address is a subset of and included within the substrate IP address, and wherein the extracting of the stored virtual IP address from the header includes extracting the stored virtual IP address from within the substrate IP address.

7. The computer-implemented method of claim 1 further comprising:
   storing, on the second computer system and before the modifying of the outgoing communication, the mapping information to associate the virtual IP address of the first node with the substrate IP address of the first node.

8. The computer-implemented method of claim 7 wherein the second computer system execute a source communication manager module that assists in implementing the virtual computer network by managing communications for the first node, wherein the computer system executes a destination communication manager module that assists in implementing the virtual computer network by managing communications for the second node, and wherein the storing of the mapping information on the computer system and on the second computer system further includes interacting with a remote system manager module that maintains information about virtual IP addresses assigned to multiple computing nodes of the virtual computer network and about substrate IP addresses associated with the multiple computing nodes.

9. The computer-implemented method of claim 1 wherein the determining that the received communication is authorized includes determining a location in the substrate network corresponding to the first node, and verifying that the received communication was forwarded over the substrate network from the determined location.

10. The computer-implemented method of claim 1 wherein the determining that the received communication is authorized includes determining that the virtual IP address for the first node is assigned for the virtual computer network to one of multiple computing nodes of the virtual computer network.

11. The computer-implemented method of claim 8 wherein the determining that the received communication is authorized includes identifying the source communication manager module associated with the first node, and verifying that the received communication was forwarded over the substrate network from the identified source communication manager module.

12. The computer-implemented method of claim 11 wherein the storing of the mapping information by the computer system is performed before the communication is forwarded over the substrate network.

13. The computer-implemented method of claim 1 wherein the storing of the mapping information includes obtaining, by the computer system and before the receiving of the communication, the mapping information from a system manager module that further assists in implementing the virtual computer network.

14. The method of claim 1 wherein the virtual computer network is implemented using the IPv4 ("Internet Protocol version 4") networking protocol.

15. The method of claim 1 wherein the substrate network is implemented using the IPv4 ("Internet Protocol version 4") networking protocol.

16. A non-transitory computer-readable medium having stored contents that cause first and second computer systems to:
- store, on the first computer system and on the second computer system, mapping information that is for a virtual computer network and that associates a virtual Internet Protocol (IP) address of a first node in the virtual computer network with a substrate IP address of the first node for use within a substrate network on which the virtual computer network is overlaid, wherein the first computer system provides the first node and the virtual IP address is for use within the virtual computer network, and wherein the second computer system provides a second node for the virtual computer network;
- modify, by the first computer system and for an outgoing communication that is from the first node to the second node and that includes the virtual IP address of the first node as a source IP address for the outgoing communication, the outgoing communication by adding, as a source IP address for the modified outgoing communication in a header of the modified outgoing communication, the substrate IP address of the first node from the mapping information stored on the first computer system;
- forward, over the substrate network, the modified outgoing communication from the first computer system to the second computer system;
- receive, by the second computer system, the forwarded modified outgoing communication as an incoming communication for the second node;
- retrieve, by the second computer system and from information included in the received incoming communication, the virtual IP address for the first node and the substrate IP address for the first node;
- determine, by the second computer system, that the received incoming communication is authorized for the second node based on the virtual IP address for the first node matching the substrate IP address for the first node in the mapping information stored on the second computer system; and
- initiate, by the second computer system and based on the determining that the received incoming communication is authorized, providing of the received incoming communication to the second node.

17. The non-transitory computer-readable medium of claim 16 wherein the stored contents include software instructions that, when executed, further cause the second computer system to modify the received incoming communication to format the received incoming communication for the virtual computer network, and wherein the communication provided to the second node is the modified received incoming communication.

18. The non-transitory computer-readable medium of claim 16 wherein the determining by the second computer system that the received incoming communication is authorized includes determining a location in the substrate network corresponding to the first node, and includes verifying that the received incoming communication was forwarded to the second computer system over the substrate network from the determined location.

19. The non-transitory computer-readable medium of claim 16 wherein the stored contents further cause the first computer system and the second computer system to each execute a communication manager module that assists in implementing the virtual computer network by managing communications between multiple nodes of the virtual computer network.

20. The non-transitory computer-readable medium of claim 16 wherein at least one of the virtual computer network or the substrate network is implemented using IPv4 ("Internet Protocol version 4") networking protocol.

21. A system, comprising:
- one or more hardware processors; and
- one or more memories including instructions that, upon execution by at least one of the one or more hardware processors, cause the system to:
  - store, on a first computer system that provides a first node for a virtual computer network and on a second computer system that provides a second node, mapping information that associates a virtual Internet Protocol (IP) address of the first node with a substrate IP address of the first node, wherein the virtual IP address is for use within the virtual computer network, and wherein the substrate IP address is for use within a substrate network on which the virtual computer network is overlaid;
  - modify, by the first computer system and based on the mapping information stored on the first computer system, an outgoing communication that is from the first node to the second node to cause the modified outgoing communication to include both the virtual IP address for the first node and the substrate IP address of the first node;
  - retrieve, by the second computer system and after the modified outgoing communication is forwarded over the substrate network from the first computer system, the virtual IP address for the first node and the substrate IP address for the first node from information included in the forwarded communication;
  - determine, by the second computer system, that the forwarded communication is authorized for the second node based on using the mapping information stored on the second computer system to match the retrieved virtual IP address for the first node with the retrieved substrate IP address for the first node; and
  - cause, by the second computer system and based on the determining that the forwarded communication is authorized, the forwarded communication to be provided to the second node.

22. The system of claim 21 wherein the instructions further cause the second computer system to receive the forwarded modified outgoing communication, and to further modify the received communication to be formatted for the virtual computer network, and wherein the communication provided to the second node is the further modified communication.

23. The system of claim 21 wherein the determining by the second computer system that the forwarded communication is authorized includes determining a location in the substrate network corresponding to the first node, and verifying that the forwarded communication was forwarded to the second computer system over the substrate network from the determined location.

24. The system of claim 21 wherein the instructions further cause the first computer system and the second computer system to each execute a communication manager module that assists in implementing the virtual computer network by managing communications between multiple nodes of one or more virtual computer networks.

25. The system of claim 21 wherein at least one of the virtual computer network or the substrate network is implemented using IPv4 ("Internet Protocol version 4") networking protocol.

26. The system of claim 21 further comprising the first computer system and the second computer system and multiple virtual machines hosted on the first and second computer systems that each use a subset of the one or more memories, and wherein the first node and the second node are each one of the multiple hosted virtual machines.

27. The system of claim 21 wherein the first node is associated with a first entity identifier for an entity that controls the first node, wherein the second node is associated with a second entity identifier for an entity that controls the second node, and wherein the determining that the forwarded communication is authorized for the second node includes determining that the first and second entity identifiers match.

28. The system of claim 21 wherein the first node is associated with a first entity identifier for an entity that controls the first node, wherein the second node is associated with a second entity identifier for an entity that controls the second node, and wherein the determining that the received communication is authorized for the second node includes determining that the first entity identifier is authorized to send communications to the second node.

29. The system of claim 21 wherein the virtual computer network is one of multiple virtual computer networks provided by an online service on behalf of multiple customers, and wherein the first node and the second node are provided by the online service.

30. The system of claim 29 wherein the first node is part of a first provided virtual computer network of the multiple virtual computer networks, and wherein the second node is part of a distinct second provided virtual computer network of the multiple virtual computer networks.

* * * * *